US012786109B2

(12) United States Patent
Singh et al.

(10) Patent No.: US 12,786,109 B2
(45) Date of Patent: Nov. 3, 2026

(54) METHOD FOR PROBING NETWORK PATHS IN DISAGGREGATED SCHEDULED FABRICS AND A SYSTEM THEREOF

(71) Applicant: Cisco Technology, Inc., San Jose, CA (US)

(72) Inventors: Tapraj Singh, San Ramon, CA (US); Vijay Krishnaji Tapaskar, Palo Alto, CA (US); Rakesh Chopra, Menlo Park, CA (US); Praveen Bhagwatula, Cary, NC (US); Srinivas V. Garigipati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 18/784,707

(22) Filed: Jul. 25, 2024

(65) Prior Publication Data

US 2025/0274382 A1 Aug. 28, 2025

Related U.S. Application Data

(60) Provisional application No. 63/558,551, filed on Feb. 27, 2024.

(51) Int. Cl.
*H04L 45/00* (2022.01)
*H04L 45/02* (2022.01)
*H04L 49/25* (2022.01)

(52) U.S. Cl.
CPC .............. *H04L 45/26* (2013.01); *H04L 45/02* (2013.01); *H04L 49/25* (2013.01)

(58) Field of Classification Search
CPC .......... H04L 45/26; H04L 45/02; H04L 49/25
See application file for complete search history.

(56) References Cited

U.S. PATENT DOCUMENTS 9,692,652 B2 * 6/2017 Lin ........................ H04L 49/557
10,063,464 B2 8/2018 Ashwood-Smith
(Continued)

FOREIGN PATENT DOCUMENTS

EP 3231139 B1 2/2018
WO 2021226451 A1 11/2021

OTHER PUBLICATIONS

European Search Report for European Application No. 25155080.2, dated Jul. 2, 2025, 13 Pages.
(Continued)

*Primary Examiner* — David R Lazaro
*Assistant Examiner* — Xiang Yu
(74) *Attorney, Agent, or Firm* — Rutan & Tucker, LLP; Ravi Mohan; Marc A. McClain

(57) ABSTRACT

Devices, networks, systems, methods, and processes for probing a network path in a Disaggregated Scheduled Fabric (DSF) are described herein. A source device, such as a first leaf switch can receive a probe command and identify a network path associated with the probe command. The first leaf switch may generate, based on the probe command, a probe packet comprising a fabric header. The first leaf switch can identify an adjacent device such as a spine switch and transmit the probe packet to the spine switch. The spine switch can forward the probe packet to a destination device, such as a second leaf switch. The second leaf switch may generate and transmit a response probe packet in response to the probe packet. The probe packet can be utilized to measure one or more Quality of Service (QOS) parameters such as jitter, latency, packet loss, or congestion etc. for example.

20 Claims, 9 Drawing Sheets

(56) References Cited

U.S. PATENT DOCUMENTS

| | | | |
|---|---|---|---|
| 2010/0165983 | A1 | 7/2010 | Aybay et al. |
| 2014/0185611 | A1 | 7/2014 | Lie et al. |
| 2018/0062990 | A1 * | 3/2018 | Kumar .................... H04L 45/02 |
| 2018/0077064 | A1 * | 3/2018 | Wang .................... H04L 47/115 |
| 2023/0216774 | A1 | 7/2023 | Suryanarayana et al. |
| 2024/0039869 | A1 | 2/2024 | Marks |

OTHER PUBLICATIONS

Filsfils C., et al., "Segment Routing Policy Architecture", Internet Engineering Task Force, IETF, Standard, Internet Society (ISOC) 4, Rue Des Falaises CH—1205 Geneva, Switzerland, Jul. 24, 2022, 22 Pages, XP015152742, Retrieved from https://tools.ietf.org/html/rfc9256 on Jul. 24, 2022, p. 2, Line 22-p. 18, Line 10.

Pan T., et al., "In-band Network-Wide Telemetry; draft-tian-bupt-inwt-mechanism-policy-01.t xt", Internet Engineering Task Force, IETF; Standardworkingdraft, Internet Society (ISOC) 4, Rue Des Fala , No. 1, Oct. 25, 2020, pp. 1-15, XP015142316, Retrieved from https://tools.ietf.org/html/draft-tian-bupt-inwt-mechanism-policy-01 on Oct. 25, 2020, p. 2, Line 32-p. 8, Line 13, Figures 1,2.

* cited by examiner

METHOD FOR PROBING NETWORK PATHS IN DISAGGREGATED SCHEDULED FABRICS AND A SYSTEM THEREOF

This application claims the benefit of U.S. Provisional Patent Application No. 63/558,551, filed Feb. 27, 2024, which is incorporated by reference herein in its entirety.

The present disclosure relates to communication networks. More particularly, the present disclosure relates to probing a network path in a Disaggregated Scheduled Fabric (DSF) network.

BACKGROUND

Networks include a large number of network devices such as spine switches, leaf switches, routers, gateways etc. The spine and leaf switches may be interconnected in a leaf-spine topology to provide multiple routes for forwarding or routing data traffic in the network between endpoints. The spine switches may interconnect the leaf switches to form a backbone of the network. The leaf switches can function as an access layer that connects to host devices. The leaf switches may serve as entry and exit points for traffic originating from or destined to the host devices. When the host devices are connected to different leaf switches, a path between the host devices may include multiple hops. The leaf-spine fabric can provide a scalable and efficient architecture for routing large data flows and traffic within a data center network.

In conventional networks, probes may be utilized to assess health, performance, and reliability of the leaf-spine fabric. By transmitting multiple probe packets, a network operator can measure one or more Quality of Service (QOS) parameters such as jitter, latency, packet loss, or bandwidth availability. The probe packets can also facilitate identifying congestions within the network. The probe packets may be transmitted dynamically and/or periodically to monitor changes in network conditions. The measured QoS parameters can be utilized to optimize the network.

In conventional Disaggregated Scheduled Fabrics (DSFs), data packets are randomly sprayed over multiple network paths, which is a departure from traditional networks where the data packets are transmitted over predetermined network paths. The random spraying of the data packets causes challenges in measuring the QoS parameters associated with the network paths. The conventional DSFs lack mechanisms for deterministically selecting and probing a network path. Therefore, when the data packets are randomly sprayed over the network paths, the QoS parameters for a particular path cannot be determined. Moreover, the conventional networks do not provide monitoring the QoS parameters for the network paths individually.

Therefore, there exists a need for a technique for deterministic path selection and probing in the DSFs.

SUMMARY OF THE DISCLOSURE

Systems and methods for probing a network path in a Disaggregated Scheduled Fabric (DSF) in accordance with embodiments of the disclosure are described herein. In some embodiments, a device includes a processor, and a memory communicatively coupled to the processor, wherein the memory includes a path probing logic that is configured to receive a probe command associated with a destination device, select at least one network path associated with the destination device, construct a fabric header indicative of the at least one network path, and generate a probe packet including the fabric header.

In some embodiments, the path probing logic is further configured to access a database, and wherein the database is configured to store routing data indicative of a plurality of network paths.

In some embodiments, the selection of the at least one network path is based on the plurality of network paths.

In some embodiments, the path probing logic is further configured to determine at least one system port associated with the at least one network path.

In some embodiments, the path probing logic is further configured to map the probe packet to a virtual output queue associated with the at least one system port.

In some embodiments, the path probing logic is further configured to identify, based on the routing data, at least one adjacent device associated with the at least one network path.

In some embodiments, the path probing logic is further configured to identify, based on the routing data, at least one adjacent device port of the at least one adjacent device.

In some embodiments, the at least one adjacent device port is connected to the destination device.

In some embodiments, the fabric header includes a fabric element field indicative of at least one of an adjacent device identifier associated with the at least one adjacent device, or an adjacent device port identifier associated with the at least one adjacent device port.

In some embodiments, the fabric header further includes a fabric link identifier associated with the at least one network path.

In some embodiments, the path probing logic is further configured to transmit the probe packet to the at least one adjacent device through the at least one system port.

In some embodiments, the probe packet is forwarded to the destination device based on the fabric header.

In some embodiments, the plurality of network paths interconnect a plurality of devices including the at least one adjacent device and the destination device.

In some embodiments, the probe packet further includes a network processing unit header and packet data.

In some embodiments, a method includes accessing a database, wherein the database is configured to store routing data indicative of a plurality of network paths, receiving a probe command associated with a destination device, selecting, from the plurality of network paths, at least one network path associated with the destination device, constructing a fabric header indicative of the at least one network path, generating a probe packet including the fabric header, and transmitting the probe packet to the destination device.

In some embodiments, the method further includes determining at least one system port associated with the at least one network path, and mapping the probe packet to a virtual output queue associated with the at least one system port.

In some embodiments, the method further includes identifying, based on the routing data, at least one of at least one adjacent device associated with the at least one network path, or at least one adjacent device port of the at least one adjacent device connected to the destination device.

In some embodiments, the fabric header includes a fabric element field indicative of at least one of an adjacent device identifier associated with the at least one adjacent device, or an adjacent device port identifier associated with the at least one adjacent device port.

In some embodiments, transmitting the probe packet includes transmitting the probe packet to the at least one adjacent device through the at least one system port, and wherein the probe packet is forwarded to the destination device based on the fabric header.

In some embodiments, path probing logic is configured to receive a probe packet from a source device, retrieve a fabric header from the probe packet, determine an egress port based on the fabric header, identify a destination device associated with the egress port, and forward the probe packet to the destination device through the egress port.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
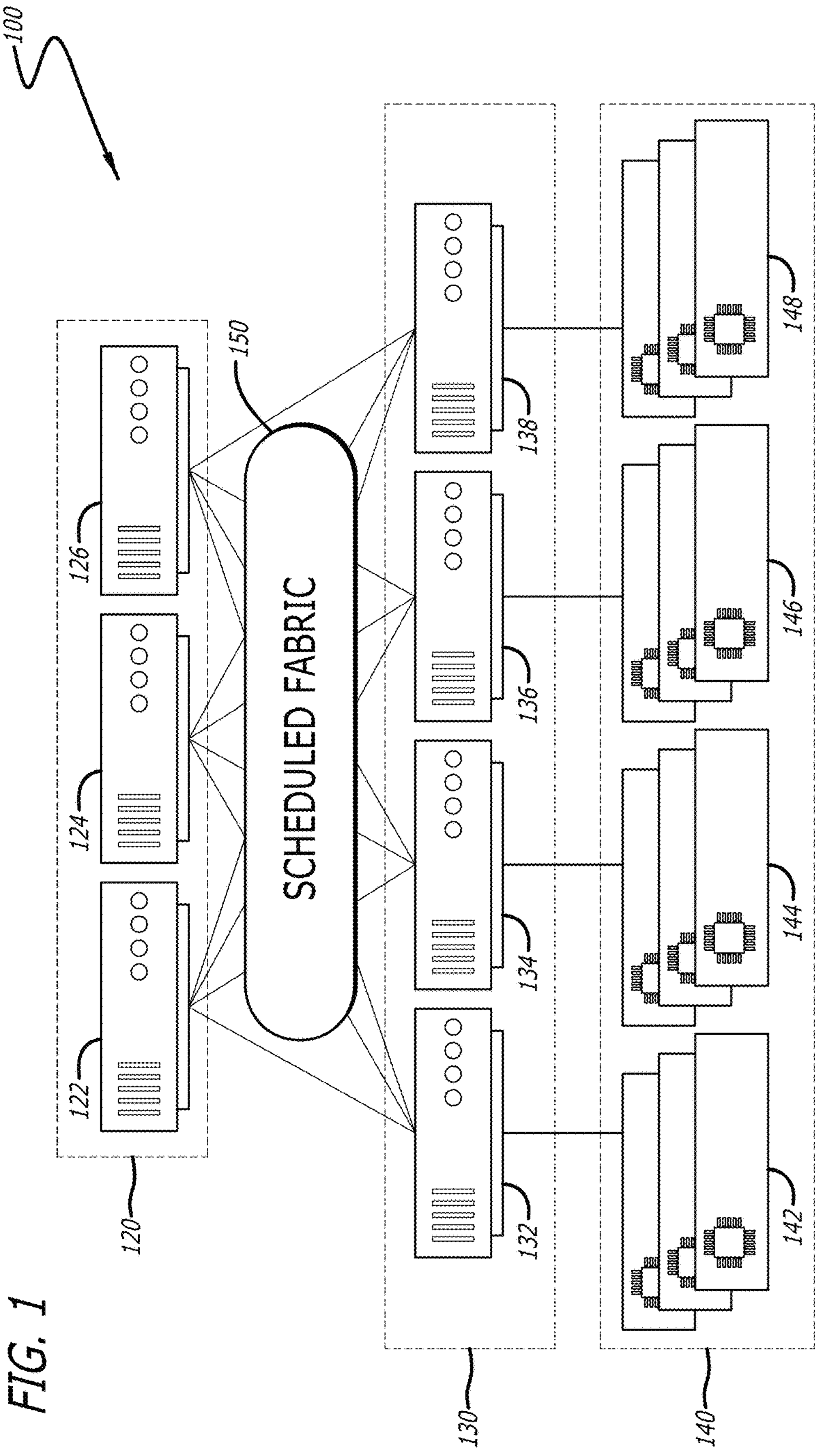
FIG. 1 is a conceptual illustration of a network illustrating a Disaggregated Scheduled Fabric (DSF), in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide probing a network path in a Disaggregated Scheduled Fabric (DSF). In many embodiments, the DSF may include a plurality of network devices such as but not limited to spine switches or leaf switches, for example. A plurality of spine and leaf switches can be connected in a leaf-spine topology, i.e., a leaf-spine fabric. The leaf switches may include Top-Of-Rack (TOR) switches or End of Row (EOR) switches etc., for example. Multiple TOR switches and one or more spine switches can be connected in a mesh topology. The TOR switches may be deployed at an edge of a network, near servers, storage arrays, and other network devices such as but not limited to application servers or virtual machines etc. for example. The TOR switches can be connected to the host devices directly or indirectly. The TOR switches may also facilitate Virtual Local Area Network (VLAN) tagging, routing protocols, access control lists, or Quality of Service (QoS) etc., for example.

In a number of embodiments, the plurality of network devices in the DSF may access a database. The database can be a distributed database and may be stored, updated, or modified by the network devices. The database may store routing data. In numerous embodiments, for example, the database can be Redis database. The routing data can be indicative of a graph of a plurality of network paths in the network. The network paths may be one or more fabric paths in the DSF, i.e., one or more routing or forwarding paths between the network devices in the DSF. In some embodiments, a source device can be connected to a destination device by way of an adjacent device. In certain embodiments, for example, the source device can be a first leaf switch, the destination device can be a second leaf switch, and the adjacent device can be a spine switch. In more embodiments, the spine switch may be connected to the first leaf switch and the second leaf switch. In some more embodiments, the routing data may store one or more network paths between the first leaf switch and the second leaf switch. The one or more network paths may include a first sub-path between the first leaf switch and the spine switch and a second sub-path between the spine switch and the second leaf switch. The routing data may be further indicative of one or more of: a first leaf switch identifier associated with the first leaf switch, a second leaf switch identifier associated with the second leaf switch, or a spine switch identifier associated with the spine switch. The routing data can be further indicative of a set of adjacent device ports of the spine switch and corresponding first set of adjacent device port identifiers associated with the one or more network paths.

In various embodiments, a probe may be initiated to probe the one or more network paths between the first leaf switch and the second leaf switch. In some embodiments, the first leaf switch may receive a probe command associated with the second leaf switch. The first leaf switch can select a first network path from the one or more network paths based on the probe command. In certain embodiments, for example, the probe command may be indicative of the first network path. In more embodiments, the probe command can be received by the first leaf switch. The first leaf switch can identify the spine switch associated with the first network path. The first leaf switch may identify an adjacent device port associated with the spine switch. The adjacent device port may be connected to the second leaf switch.

In additional embodiments, the first leaf switch may construct a fabric header. The first leaf switch can generate a probe packet comprising the fabric header, a Network Processing Unit (NPU) header and packet data. In some embodiments, the fabric header can be a source routed fabric header. The fabric header can be indicative of the first network path. The fabric header may comprise a fabric element field. The fabric element field may be utilized to forward the probe packet to the second leaf switch. The fabric element field can be indicative of the adjacent device identifier associated with the spine switch. The fabric element field may further be indicative of the adjacent device port identifier. In more embodiments, for example, the adjacent device identifier in the fabric element field can be utilized to terminate the probe packet at the spine switch. That is, in some more embodiments, the probe packet may be punted to a processor and/or a control plane at the spine switch. The spine switch can process the probe packet to determine the adjacent device port identifier. The adjacent device port identifier may be indicative of an egress port through which the probe packet can be forwarded by the spine switch. The spine switch can identify the network device, i.e., the second leaf switch connected to the egress port. The spine switch may forward the probe packet through the egress port to the second leaf switch, thereby effectively terminating the probe packet at the second leaf switch. Hence, the fabric element field may be utilized to effectively forward the probe packet to the second leaf switch. In further embodiments, for example, the fabric header can also comprise a fabric link identifier. The fabric link identifier may be indicative of the first network path. The spine switch may utilize the fabric link identifier to identify the first network path and thereby the second leaf switch associated with the first network path. The spine switch can forward the probe packet to the second leaf switch based on the fabric link identifier. In some embodiments, the first leaf switch may generate and transmit multiple probe packets to the second leaf switch over the first network path. In more embodiments, the first leaf switch can generate and transmit multiple probe packets over each network path of the one or more network paths between the first leaf switch and the second leaf switch.

In many more embodiments, for example, the second leaf switch may generate and transmit a response probe packet to the first leaf switch in response to the probe packet. In some embodiments, for example, transmission and/or reception times of the probe packet and/or the response probe packet at each of the first leaf switch, the spine switch, and the second leaf switch may be utilized to measure one or more QoS parameters of the first network path. In certain embodiments, examples of the QoS parameters include but are not limited to delay, jitter, or Round-Trip Time (RTT) etc. In more embodiments, for example, a difference between the transmission time of the probe packet and the reception time of the response probe packet at the first leaf switch may be utilized to determine the RTT. In some more embodiments, for example, the transmission time of the probe packet at the first leaf switch and the reception time of the probe packet at the second leaf switch can be utilized to determine a Source-to-Destination (SD) jitter. In numerous embodiments, for example, the transmission time of the response probe packet at the second leaf switch and the reception time of the response probe packet at the first leaf switch can be utilized to determine a Destination-to-Source (DS) jitter. In still many embodiments, the probe packet can also be utilized to measure other QoS parameters, such as but not limited to, fabric link health, fabric link state (such as active, inactive, or faulty, etc.), bandwidth, congestion, delay, packet loss, or any other QoS parameters, for example. In many more embodiments, for example, the probe packet may also be utilized to measure one or more Service Level Agreement (SLA) metrics associated with the DSF.

Advantageously, the path probing technique of the present disclosure may be utilized to dynamically monitor health of the network paths between the network devices in the DSF. The probe packets transmitted over the network paths can facilitate measurement of multiple QoS parameters and/or SLA metrics associated with the network paths in the DSF. The path probing technique can also provide creating, utilizing, and dynamically updating a global fabric path topology stored in the database. The path probing technique provides deterministic network path selection and probing in the DSF.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100 illustrating a Disaggregated Scheduled Fabric (DSF), in accordance with various embodiments of the disclosure is shown. In many embodiments, the network 100 may comprise a set of spine switches 120 including first through third spine switches 122 to 126, a set of leaf switches 130 including first through fourth leaf switches 132 to 138, and a set of host devices 140 including first through fourth host devices 142 to 148. The set of spine switches 120 and the set of leaf switches 130 may be connected by a scheduled fabric 150. In some embodiments, the set of host devices 140 may include one or more Graphical Processing Units (GPUs), smart Network Interface Cards (NICs), Data Processing Units (DPUs), or any other type of endpoints etc. for example.

In a number of embodiments, for example, the network 100 can be a high-performance computing network configured for Artificial Intelligence (AI)/Machine Learning (ML) applications. The DSF can include one or more clusters utilized for AI/ML training. The set of spine switches 120 and/or the set of leaf switches 130 can be configured to store one or more Virtual Output Queues (VOQs) to create a distributed single routing or switching instance. In certain embodiments, the set of leaf switches 130 can include fabric facing ports connected to the set of spine switches 120 and network facing ports connected to the set of host devices 140. The DSF can facilitate system port representation for the network facing ports and/or fabric facing ports of the set of leaf switches 130. In numerous embodiments, for example, one or more VOQs can be assigned for the system ports of leach leaf switch of the set of leaf switches 130. The set of spine switches 120 and/or the set of leaf switches 130 may facilitate modular chassis that can be configured for different types of operating systems. The scheduled fabric 150 can include a plurality of network paths, i.e., fabric links connected between the set of spine switches 120 and the set of leaf switches 130. The network paths or fabric links can be configured to utilize different types of interconnect technologies. The transmission of data packets in the scheduled fabric 150 can be performed by way of packet spraying and re-ordering. In that, the data packets can be sprayed across one or more network paths or fabric links, and can be re-ordered at exit, thereby avoiding congestion. In some embodiments, for example, the spraying of the data packets may be performed as uniformly as possible across the network paths or fabric links. In certain embodiments, for example, the spraying of the data packets can be based on a Weighted Round Robin (WRR) technique. In that, in some more embodiments, for example, the set of leaf switches 130 can include a WRR scheduler and/or a VOQ scheduler configured to spray the data packets across the network paths or fabric links. In more embodiments, the data packets may be randomly sprayed over the network paths or fabric links.

In various embodiments, the set of spine switches 120 and the set of leaf switches 130 may be connected in a full mesh topology. The set of leaf switches 130 may be configured to establish an in-band communication network by way of the scheduled fabric 150. The in-band communication network may facilitate establishing one or more in-band communication sessions between any two leaf switches of the set of leaf switches 130. In some embodiments, the in-band communication sessions can be based on internal Border gateway Protocol (iBGP). The iBGP sessions can be utilized to distribute routing data among the set of leaf switches 130. In numerous embodiments, the routing data can be distributed by way of Ethernet VPN (EVPN). In certain embodiments, the routing data may include, but is not limited to, Internet Protocol (IP) prefixes, Media Access Control (MAC) addresses, encapsulation indexes, or next hop interfaces etc. for example.

Although a specific embodiment for the network 100 for carrying out the various steps, processes, methods, and operations described herein is discussed with respect to FIG. 1, any of a variety of systems and/or processes may be utilized in accordance with embodiments of the disclosure. For example, the network 100 can be an AI/ML network that facilitates independent/distributed control plane, scheduled fabric, and packet spraying. The elements depicted in FIG. 1 may also be interchangeable with other elements of FIGS. 2-9 as required to realize a particularly desired embodiment.

Figure 2:
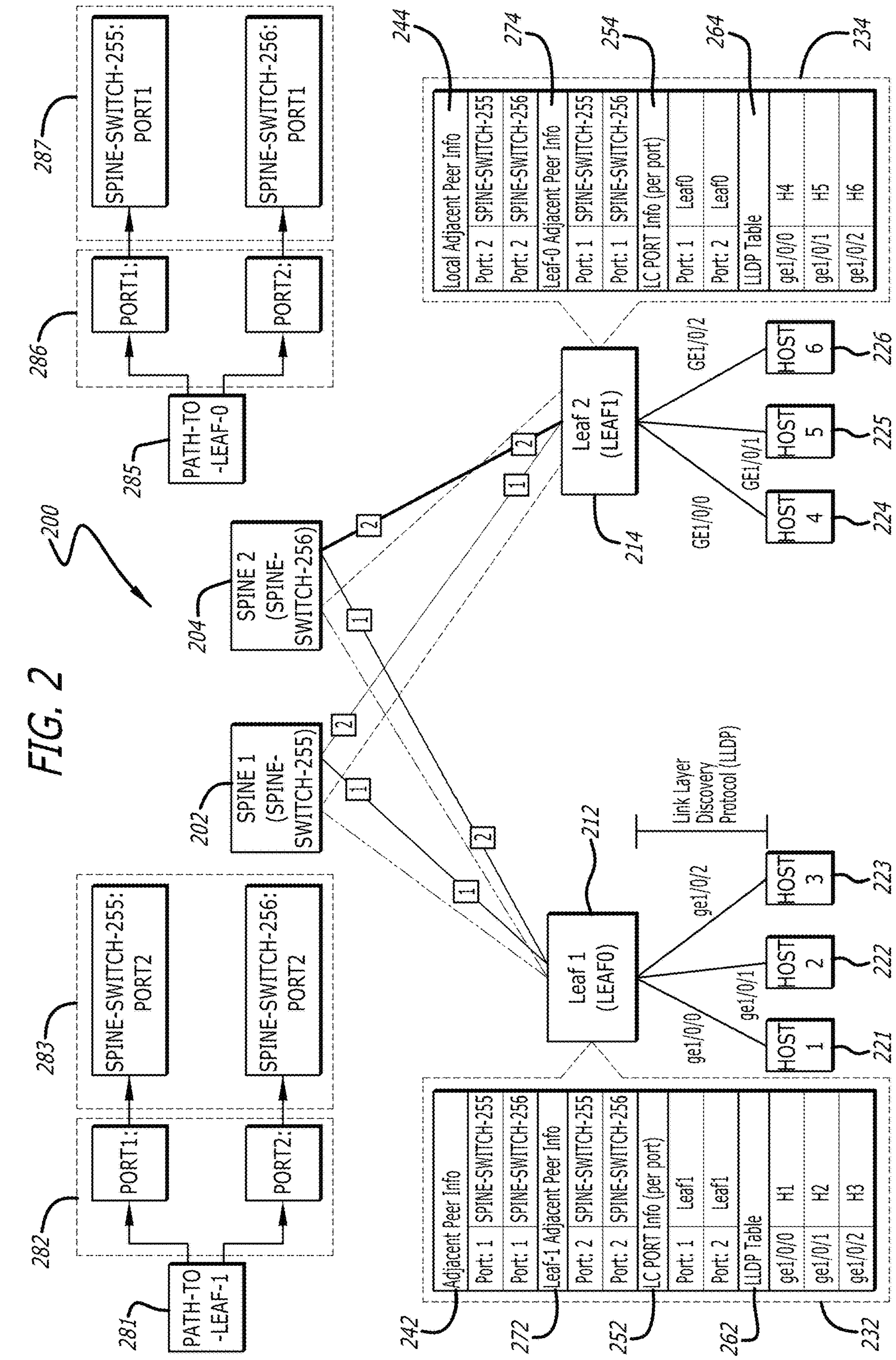
FIG. 2 is a conceptual illustration of a network illustrating a global fabric topology, in accordance with various embodiments of the disclosure.

Referring to FIG. 2, a conceptual illustration of a network 200 illustrating a global fabric topology, in accordance with various embodiments of the disclosure is shown. In many embodiments, the network 200 may comprise a first spine switch 202, a second spine switch 204, a first leaf switch 212, a second leaf switch 214, first through third host devices 221 to 223 connected to the first leaf switch 212, and fourth through sixth host devices 224 to 226 connected to the second leaf switch 214.

In a number of embodiments, the first leaf switch 212 can store first routing data 232. The first routing data 232 may include first local path data 242, first port data 252, and first Link Layer Discovery Protocol (LLDP) table 262 generated by the first leaf switch 212. The first leaf switch 212 can retrieve, from a distributed database, the first remote path data 272 associated with the second leaf switch 214. The first leaf switch 212 may generate a first network path 281 based on the first routing data 232. The first network path 281 can include a first set of sub-paths 282 and a second set of sub-paths 283. The first set of sub-paths 282 can be indicative of a first sub-path and a second sub-path. The first sub-path may be indicative of a first link that connects a first port of the first leaf switch 212 to a first port of the first spine switch 202. The second sub-path may be indicative of a second link that connects a second port of the first leaf switch 212 to a first port of the second spine switch 204. The second set of sub-paths 283 can be indicative of a third sub-path and a fourth sub-path. The third sub-path may be indicative of a third link that connects a second port of the first spine switch 202 to a first port of the second leaf switch 214. The fourth sub-path may be indicative of a fourth link that connects a second port of the second spine switch 204 to a second port of the second leaf switch 214. Thus, the first leaf switch 212 can generate the first network path 281 indicative of one or more fabric links that connect to the second leaf switch 214.

In various embodiments, the second leaf switch 214 can store second routing data 234. The second routing data 234 may include second local path data 244, second port data 254, and second LLDP table 264 generated by the second leaf switch 214. The second leaf switch 214 can retrieve, from the distributed database, the second remote path data 274 associated with the first leaf switch 212. The second leaf switch 214 may generate a second network path 285 based on the second routing data 234. The second network path 285 can include a third set of sub-paths 286 and a fourth set of sub-paths 287. The third set of sub-paths 286 can be indicative of a fifth sub-path and a sixth sub-path. The fifth sub-path may be indicative of a fifth link that connects a first port of the second leaf switch 214 to a second port of the first spine switch 202. The sixth sub-path may be indicative of a sixth link that connects a second port of the second leaf switch 214 to a second port of the second spine switch 204. The fourth set of sub-paths 287 can be indicative of a seventh sub-path and an eighth sub-path. The seventh sub-path may be indicative of a seventh link that connects a first port of the first spine switch 202 to a first port of the first leaf switch 212. The eighth sub-path may be indicative of an eighth link that connects a first port of the second spine switch 204 to a second port of the first leaf switch 212. Thus, the second leaf switch 214 can generate the second network path 285 indicative of one or more fabric links that connect to the first leaf switch 212.

In additional embodiments, the first leaf switch 212 can generate first global network path data comprising at least the first network path 281. The first global network path data can further include one or more network paths connecting to a plurality of leaf switches in the network 200. Similarly, the second leaf switch 214 can generate second global network path data comprising at least the second network path 284. The second global network path data can also further include one or more network paths connecting to the plurality of leaf switches in the network 200. Hence, the network 200 can facilitate generation of global network path data indicative of the global fabric topology comprising a plurality of network paths or fabric links in the leaf-spine fabric. The global network path data may be utilized to trace a path through which a packet is forwarded in the leaf-spine fabric. Thereafter, the global network path data can facilitate performing tests or measurements to determine performance metrics of the path. Examples of the performance metrics can include but are not limited to delay, jitter, packet loss, congestion, latency, bandwidth, or utilization etc. associated with the path. The global network path data may also facilitate effective measurement of network performance metrics such as throughput or efficiency etc. for example.

Although a specific embodiment for the network 200 for carrying out the various steps, processes, methods, and operations described herein is discussed with respect to FIG. 2, any of a variety of systems and/or processes may be utilized in accordance with embodiments of the disclosure. For example, the network 200 can facilitate discovering and building the global fabric topology for the DSF. The elements depicted in FIG. 2 may also be interchangeable with other elements of FIG. 1 and FIGS. 3-9 as required to realize a particularly desired embodiment.

Figure 3:
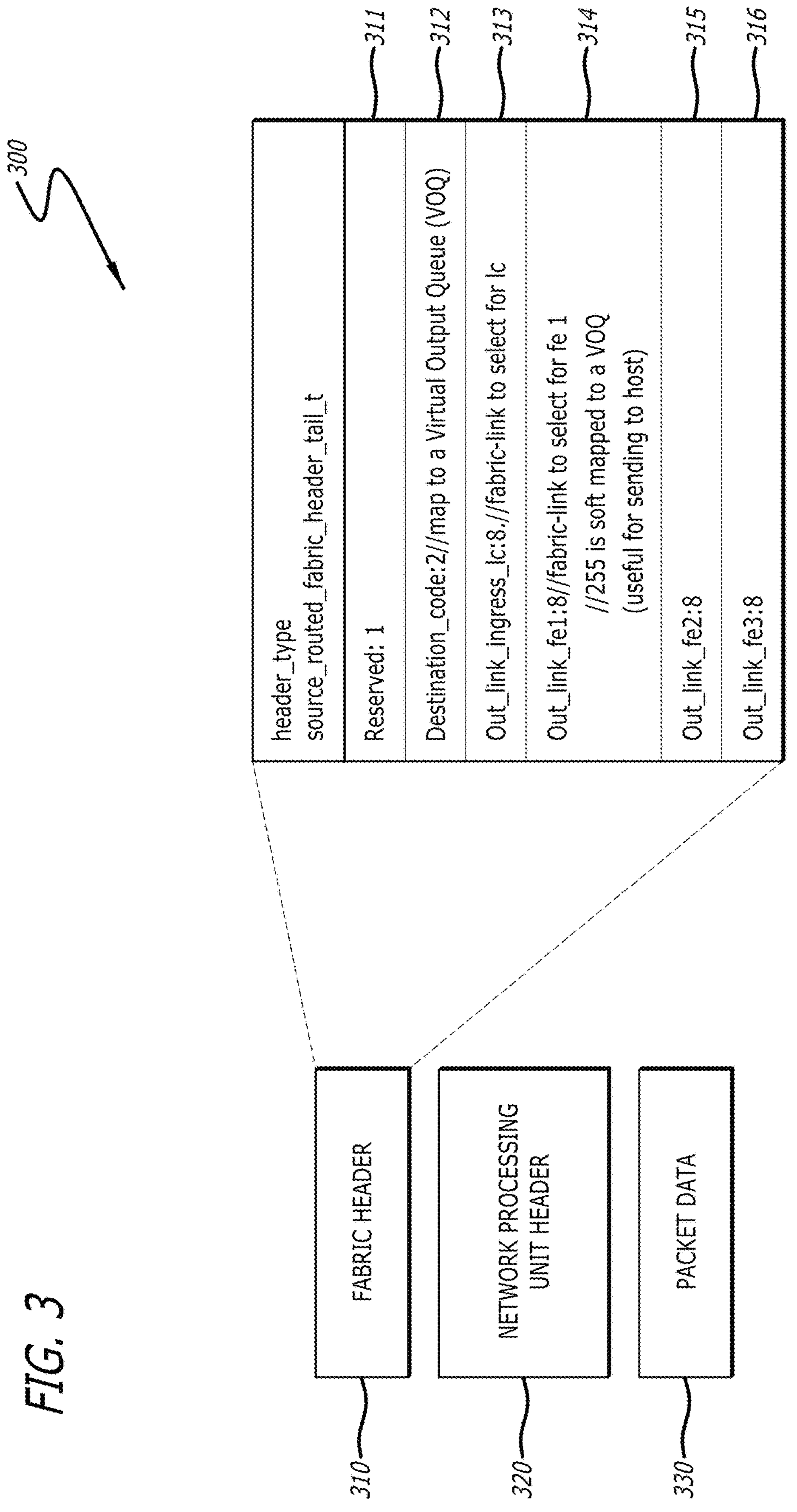
FIG. 3 is a conceptual illustration of a probe packet illustrating a fabric header, in accordance with various embodiments of the disclosure.

Referring to FIG. 3, a conceptual illustration of a probe packet 300 illustrating a fabric header, in accordance with various embodiments of the disclosure is shown. In many embodiments, a first leaf switch may receive a probe command associated with a second leaf switch. The first leaf switch can select a first network path from one or more network paths associated with the second leaf switch based on the probe command. In certain embodiments, for example, the probe command may be indicative of a first network path. The first leaf switch can identify a spine switch associated with the first network path. The first leaf switch may identify an adjacent device port associated with the spine switch. The adjacent device port may be connected to the second leaf switch.

In additional embodiments, the first leaf switch may construct the probe packet 300 comprising a fabric header 310, a Network Processing Unit (NPU) header 320 and packet data 330. In some embodiments, the fabric header 310 can be a source routed fabric header. The fabric header 310 can be indicative of the first network path. The fabric header 310 may comprise a header type field 311. In some embodiments, for example, the header type field 311 may be indicative of a type of the fabric header 310, such as the source routed fabric header, for example. The fabric header 310 can further include a destination code field 312. The fabric header 310 may also include a fabric link identifier 313. The fabric link identifier 313 may be indicative of the first network path. In certain embodiments, for example, the destination code field 312 may be indicative of a VOQ that should be mapped to the probe packet 300. The VOQ may be associated with the adjacent device port of the spine switch. The fabric header 310 may further comprise a first fabric element field 314, a second fabric element field 315, and a third fabric element field 316. The first through third fabric element fields 314 to 316 can be indicative of the adjacent device identifier associated with the spine switch. The first through third fabric element fields 314 to 316 may be utilized to forward the probe packet 300 to the second leaf switch. In some embodiments, the first through third fabric element fields 314 to 316 may further be indicative of the adjacent device port identifier associated with the spine switch. In more embodiments, for example, the adjacent device identifier in the first through third fabric element fields 314 to 316 can be utilized to terminate the probe packet 300 at the spine switch. That is, in some more embodiments, the probe packet 300 may be punted to a processor and/or a control plane at the spine switch. The spine switch can process the probe packet 300 to determine the adjacent device port identifier. The adjacent device port identifier may be indicative of an egress port through which the probe packet 300 can be forwarded by the spine switch to the second leaf switch. The spine switch can identify the network device, i.e., the second leaf switch connected to the egress port. The spine switch may forward the probe packet 300 through the egress port to the second leaf switch, thereby effectively terminating the probe packet at the second leaf switch. Hence, first through third fabric element fields 314 to 316 may be utilized to effectively forward the probe packet to the second leaf switch.

Although a specific embodiment for the probe packet 300 for carrying out the various steps, processes, methods, and operations described herein is discussed with respect to FIG. 3, any of a variety of systems and/or processes may be utilized in accordance with embodiments of the disclosure. For example, the first leaf switch may generate and transmit multiple probe packets to the second leaf switch over each network path of the one or more network paths between the first leaf switch and the second leaf switch. The elements depicted in FIG. 3 may also be interchangeable with other elements of FIGS. 1-2 and FIGS. 4-9 as required to realize a particularly desired embodiment.

Figure 4:
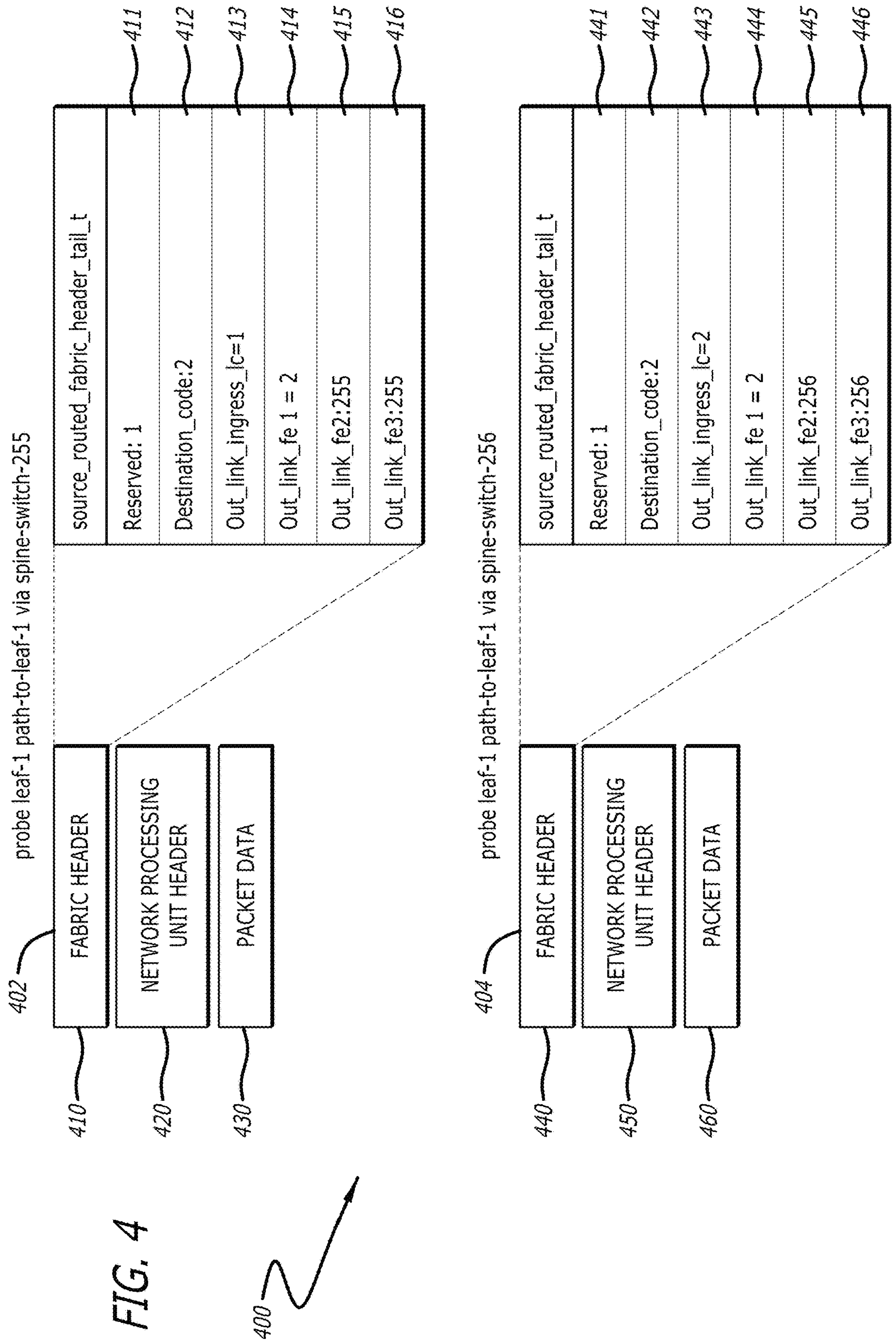
FIG. 4 is a conceptual illustration of a plurality of probe packets associated with a plurality of network paths, in accordance with various embodiments of the disclosure.

Referring to FIG. 4, a conceptual illustration of a plurality of probe packets 400 associated with a plurality of network paths, in accordance with various embodiments of the disclosure is shown. In many embodiments, a first leaf switch and a second leaf switch may be connected at least to a first spine switch and a second spine switch. Hence, the first leaf switch can be connected to the second leaf switch via at least two network paths, viz. a first network path through the first spine switch and a second network path through the second spine switch. The first leaf switch may receive the probe command indicative of probing the networks paths connecting to the second leaf switch.

In a number of embodiments, the first leaf switch can generate a first probe packet 402 associated with the first network path. The first leaf switch may transmit the first probe packet 402 to the first spine switch. The first probe packet 402 can be punted to a Route Processor (RP) and/or a control plane of the first spine switch. The first probe packet 402 can include a first fabric header 410, a first NPU header 420, and first packet data 430. The first fabric header 410 can include a first header type field 411 indicative of a type of the fabric header, i.e., a source routed fabric header. The first fabric header 410 may also include a first destination code field 412 indicative of the VOQ and/or the egress port. The first fabric header 410 can also include a first fabric link identifier 413 indicative of the first network path. The first fabric header 410 may further include first through third fabric element fields 414 to 416 indicative of a first adjacent device identifier (for e.g. 255) associated with the first spine switch. The first spine switch can thereafter forward the first probe packet 402 to the second leaf switch.

In various embodiments, the first leaf switch can generate a second probe packet 404 associated with the second network path. The first leaf switch may transmit the second probe packet 404 to the second spine switch. The second probe packet 404 can be punted to the RP and/or the control plane of the second spine switch. The second probe packet 404 can include a second fabric header 440, a second NPU header 450, and second packet data 460. The second fabric header 440 can include a second header type field 441 indicative of a type of the fabric header, i.e., a source routed fabric header. The second fabric header 440 may also include a second destination code field 442 indicative of the VOQ and/or the egress port. The second fabric header 440 can also include a second fabric link identifier 443 indicative of the second network path. The second fabric header 440 may further include fourth through sixth fabric element fields 444 to 446 indicative of a second adjacent device identifier (for e.g. 256) associated with the second spine switch. The second spine switch can thereafter forward the second probe packet 404 to the second leaf switch.

In additional embodiments, the second leaf switch can generate and transmit one or more response probe packets to the first leaf switch via the first and second spine switches. In some embodiments, for example, the second leaf switch can generate a response probe packet by copying the adjacent device port identifier in the fabric header of the probe packet. In certain embodiments, the second leaf switch can generate and transmit first and second response probe packets in response to the first and second probe packets.

Although a specific embodiment for the plurality of probe packets 400 for carrying out the various steps, processes, methods, and operations described herein is discussed with respect to FIG. 4, any of a variety of systems and/or processes may be utilized in accordance with embodiments of the disclosure. For example, the plurality of probe packets 400 can include additional fields not shown in FIG. 4. The elements depicted in FIG. 4 may also be interchangeable with other elements of FIGS. 1-3 and FIGS. 5-9 as required to realize a particularly desired embodiment.

Figure 5:
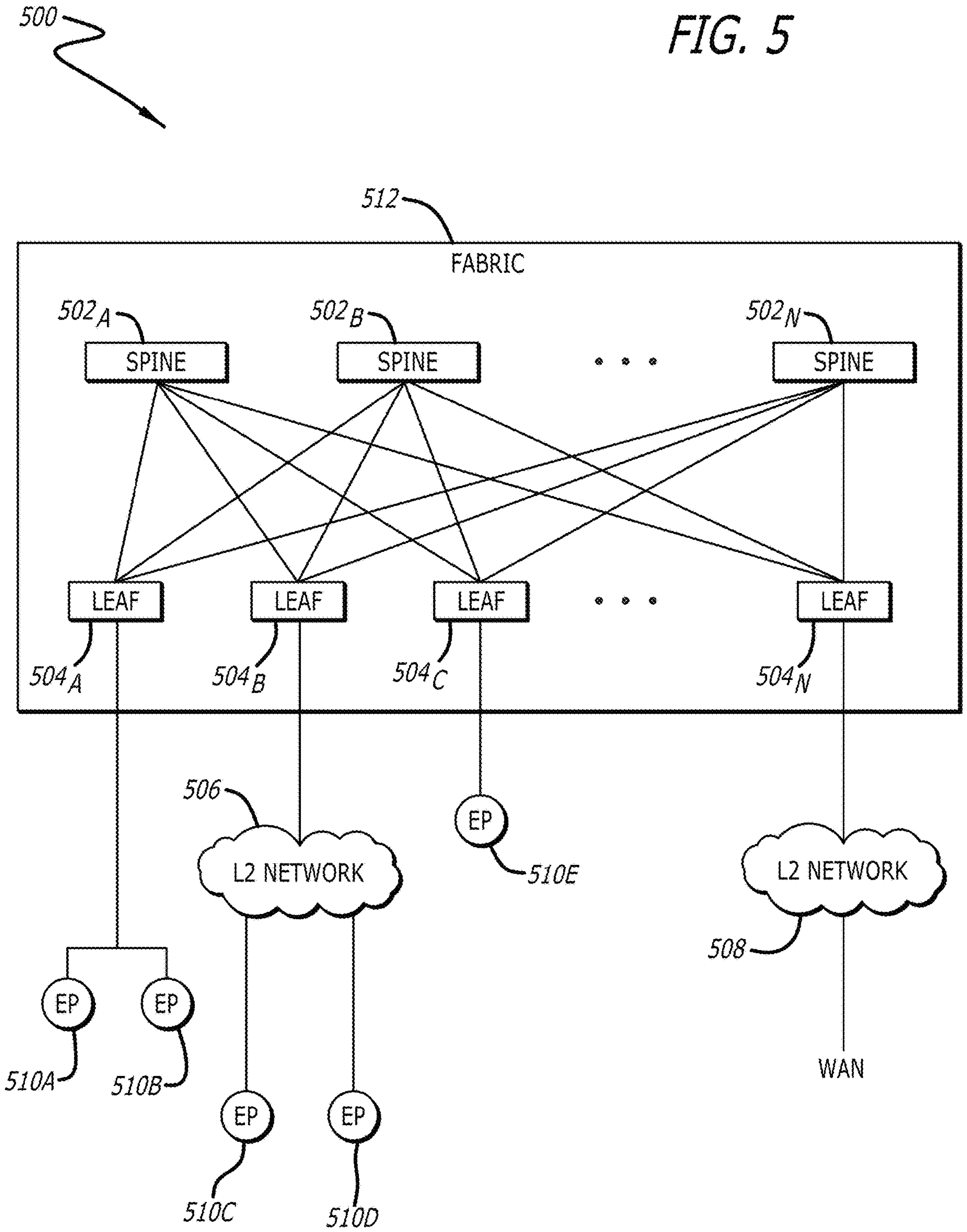
FIG. 5 is a schematic block diagram of an example architecture for a network fabric, in accordance with various embodiments of the disclosure.

Referring now to FIG. 5, a schematic block diagram of an example architecture 500 for a network fabric 512, in accordance with various embodiments of the disclosure is shown. The network fabric 512 can include spine switches $\mathbf{502}_A$, $\mathbf{502}_B$, . . . , $\mathbf{502}_N$ (collectively "502") connected to leaf switches $\mathbf{504}_A$, $\mathbf{504}_B$, $\mathbf{504}_C$ . . . $\mathbf{504}_N$ (collectively "504") in the network fabric 512. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 502 can be L3 switches in the fabric 512. However, in some cases, the spine switches 502 can also, or otherwise, perform L2 functionalities. Further, the spine switches 502 can support various capabilities, such as, but not limited to, 40 or 10 Gbps Ethernet speeds. To this end, the spine switches 502 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 502 can be configured to host a proxy function that performs a lookup of the endpoint address identifier to locator mapping in a mapping database on behalf of leaf switches 504 that do not have such mapping. The proxy function can do this by parsing through the packet to the encapsulated tenant packet to get to the destination locator address of the tenant. The spine switches 502 can then perform a lookup of their local mapping database to determine the correct locator address of the packet and forward the packet to the locator address without changing certain fields in the header of the packet.

In various embodiments, when a packet is received at a spine switch $\mathbf{502}_i$, wherein subscript "i" indicates that this operation may occur at any spine switch $\mathbf{502}_A$ to $\mathbf{502}_N$, the spine switch $\mathbf{502}_i$ can first check if the destination locator address is a proxy address. If so, the spine switch $\mathbf{502}_i$ can perform the proxy function as previously mentioned. If not, the spine switch $\mathbf{502}_i$ can look up the locator in its forwarding table and forward the packet accordingly.

In a number of embodiments, one or more spine switches 502 can connect to one or more leaf switches 504 within the fabric 512. Leaf switches 504 can include access ports (or non-fabric ports) and fabric ports. Fabric ports can provide uplinks to the spine switches 502, while access ports can provide connectivity for devices, hosts, endpoints, VMs, or external networks to the fabric 512.

In more embodiments, leaf switches 504 can reside at the edge of the fabric 512, and can thus represent the physical network edge. In some cases, the leaf switches 504 can be top-of-rack ("ToR") switches configured according to a ToR architecture. In other cases, the leaf switches 504 can be aggregation switches in any particular topology, such as end-of-row (EoR) or middle-of-row (MoR) topologies. The leaf switches 504 can also represent aggregation switches, for example.

In additional embodiments, the leaf switches 504 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 504 can contain virtual switching functionalities, such as a virtual tunnel endpoint (VTEP) function. To this end, leaf switches 504 can connect the fabric 512 to an overlay network.

In further embodiments, network connectivity in the fabric 512 can flow through the leaf switches 504. Here, the leaf switches 504 can provide servers, resources, endpoints, external networks, or VMs access to the fabric 512, and can connect the leaf switches 504 to each other. In some cases, the leaf switches 504 can connect endpoint groups to the fabric 512 and/or any external networks. Each endpoint group can connect to the fabric 512 via one of the leaf switches 504, for example.

Endpoints 510 A-E (collectively "510", shown as "EP") can connect to the fabric 512 via leaf switches 504. For example, endpoints 510A and 510B can connect directly to leaf switch 504A, which can connect endpoints 510A and 510B to the fabric 512 and/or any other one of the leaf switches 504. Similarly, endpoint 510E can connect directly to leaf switch 504C, which can connect endpoint 510E to the fabric 512 and/or any other of the leaf switches 504. On the other hand, endpoints 510C and 510D can connect to leaf switch 504B via L2 network 506. Similarly, the wide area network (WAN) can connect to the leaf switches 504C or 504D via L3 network 508.

In certain embodiments, endpoints 510 can include any communication device, such as a computer, a server, a switch, a router, etc. In some cases, the endpoints 510 can include a server, hypervisor, or switch configured with a VTEP functionality which connects an overlay network, with the fabric 512. The overlay network can host physical devices, such as servers, applications, endpoint groups, virtual segments, virtual workloads, etc. In addition, the endpoints 510 can host virtual workload(s), clusters, and applications or services, which can connect with the fabric 512 or any other device or network, including an external network. For example, one or more endpoints 510 can host, or connect to, a cluster of load balancers or an endpoint group of various applications.

Although a specific embodiment for an architecture 500 is described above with respect to FIG. 5, any of a variety of systems and/or processes may be utilized in accordance with embodiments of the disclosure. For example, the architecture 500 could comprise any variety of endpoints, spine switches, and/or leaf switches. The elements depicted in FIG. 5 may also be interchangeable with other elements of FIGS. 1-4 and 6-9 as required to realize a particularly desired embodiment.

Figure 6:
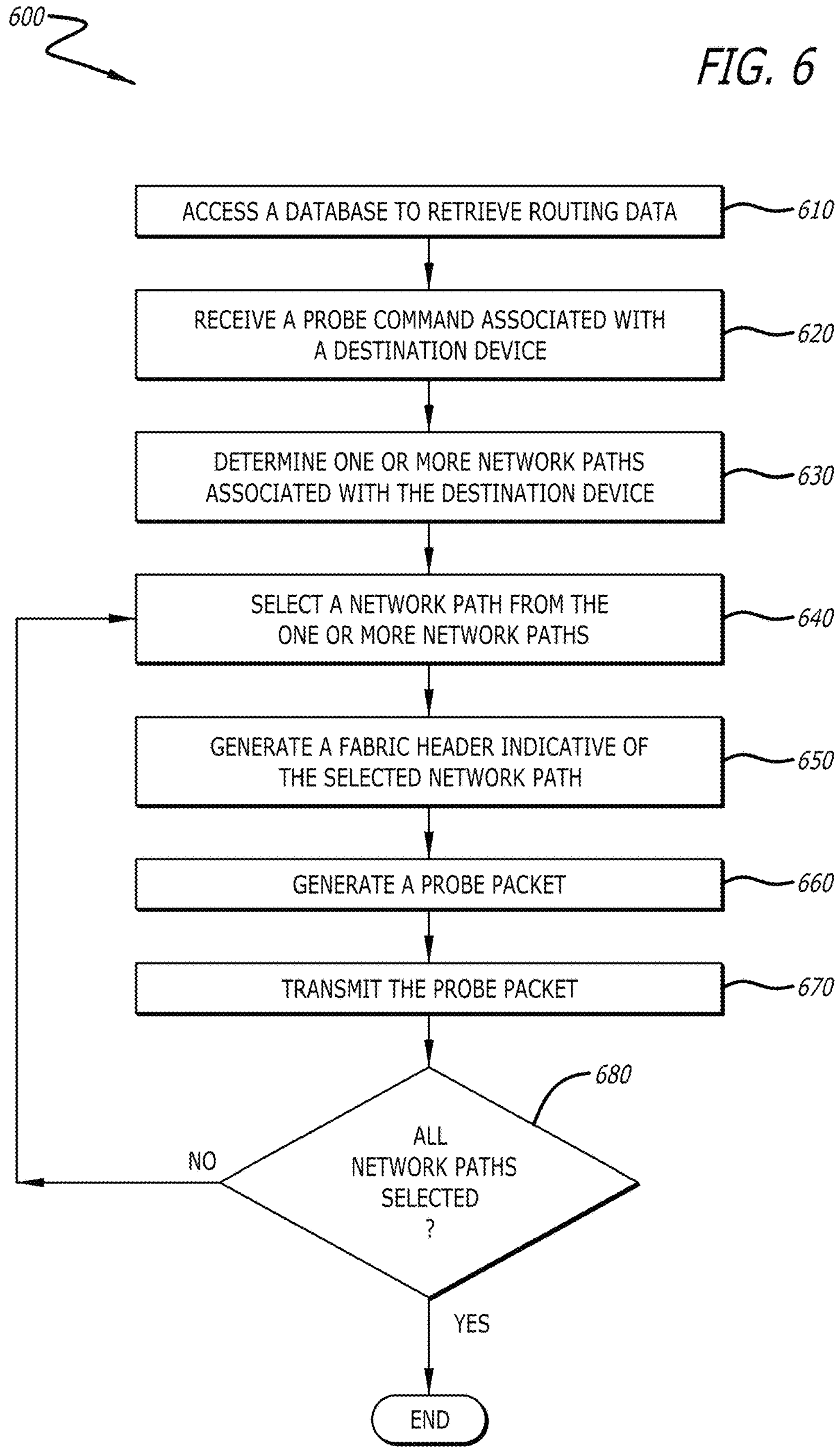
FIG. 6 is a flowchart depicting a process for generating a probe packet, in accordance with various embodiments of the disclosure.

Referring now to FIG. 6, a flowchart depicting a process 600 for generating a probe packet, in accordance with various embodiments of the disclosure is shown. In many embodiments, the process 600 can access a database to retrieve routing data (block 610). In some embodiments, the database can be a distributed database accessible to a plurality of leaf switches in the DSF. In certain embodiments, the process 600 may be performed by a source device, such as a first leaf switch of the plurality of leaf switches in the DSF. In more embodiments, the routing data can be indicative of a graph of a plurality of network paths in the network. In some more embodiments, the plurality of network paths may be one or more fabric paths in the DSF, i.e., one or more routing or forwarding paths between the plurality of leaf switches. In numerous embodiments, for example, a destination device can be a second leaf switch of the plurality of leaf switches. In many more embodiments, at least one adjacent device such as a spine switch may be connected to the first leaf switch and the second leaf switch.

In a number of embodiments, the process 600 can receive a probe command associated with the destination device (block 620). In some embodiments, the probe command may be initiated by a network administrator of the network. In certain embodiments, the first leaf switch can be configured to automate the generation and/or transmission of one or more probe commands dynamically or at predetermined time intervals. In more embodiments, the probe command may be utilized to assess health and performance of the network paths, i.e., fabric links.

In various embodiments, the process 600 may determine one or more network paths associated with the destination device (block 630). In some embodiments, the process 600 can retrieve the one or more network paths from the routing data. In certain embodiments, the one or more network paths may include a first sub-path between the first leaf switch and the spine switch and a second sub-path between the spine switch and the second leaf switch. In more embodiments, the routing data may be further indicative of a first leaf switch identifier associated with the first leaf switch, a second leaf switch identifier associated with the second leaf switch, and a spine switch identifier associated with the spine switch. In some more embodiments, the routing data can be further indicative of a set of adjacent device ports of the spine switch and corresponding set of adjacent device port identifiers associated with the one or more network paths.

In additional embodiments, the process 600 can select a network path from the one or more network paths (block 640). In some embodiments, the one or more network paths may include a first network path associated with a first spine switch and a second network path associated with a second spine switch. In certain embodiments, the selection of the network path can be based on the probe command.

In further embodiments, the process 600 may generate a fabric header indicative of the selected network path (block 650). In some embodiments, the fabric header may be indicative of at least one of: a fabric element field or a fabric link identifier. In certain embodiments, the fabric header can be utilized by the spine switch to forward the probe packet to the second leaf switch. In more embodiments, the fabric header can be indicative of the selected fabric path. In some more embodiments, the fabric header may be a source routed fabric header.

In many more embodiments, the process 600 can generate the probe packet (block 660). In some embodiments, the probe packet may include the fabric header. In certain embodiments, the probe packet can include an NPU header and packet data. In more embodiments, the NPU header may be utilized to forward the probe packet within the DSF. In some more embodiments, the packet data can be indicative of one or more QoS parameters or SLA metrics associated with the probe packet.

In many additional embodiments, the process 600 may transmit the probe packet (block 670). In some embodiments, the process 600 can generate and transmit multiple probe packets for every network path. In certain embodiments, the process 600 may transmit the probe packet to the spine switch, and the spine switch can forward the probe packet to the second leaf switch.

In many further embodiments, the process 600 can determine whether all network paths of the one or more network paths between the first leaf switch and the second leaf switch are selected (block 680). In some embodiments, the process 600 may check if there are any remaining unexplored network paths associated with the second leaf switch. In still many embodiments, if the process 600 determines that there are more network paths to explore, the process 600 may select next unexplored network path (block 640). In some embodiments, the process 600 can ensure that all the network paths of the one or more network paths between the first leaf switch and the second leaf switch are deterministically identified, selected and probed.

Although a specific embodiment for the process 600 for generating the probe packet for carrying out the various steps, processes, methods, and operations described herein is discussed with respect to FIG. 6, any of a variety of systems and/or processes may be utilized in accordance with embodiments of the disclosure. For example, the process 600 may generate and transmit different types of probe packets for measuring different QoS parameters or SLA metrics. The elements depicted in FIG. 6 may also be interchangeable with other elements of FIGS. 1-5 and FIGS. 7-9 as required to realize a particularly desired embodiment.

Figure 7:
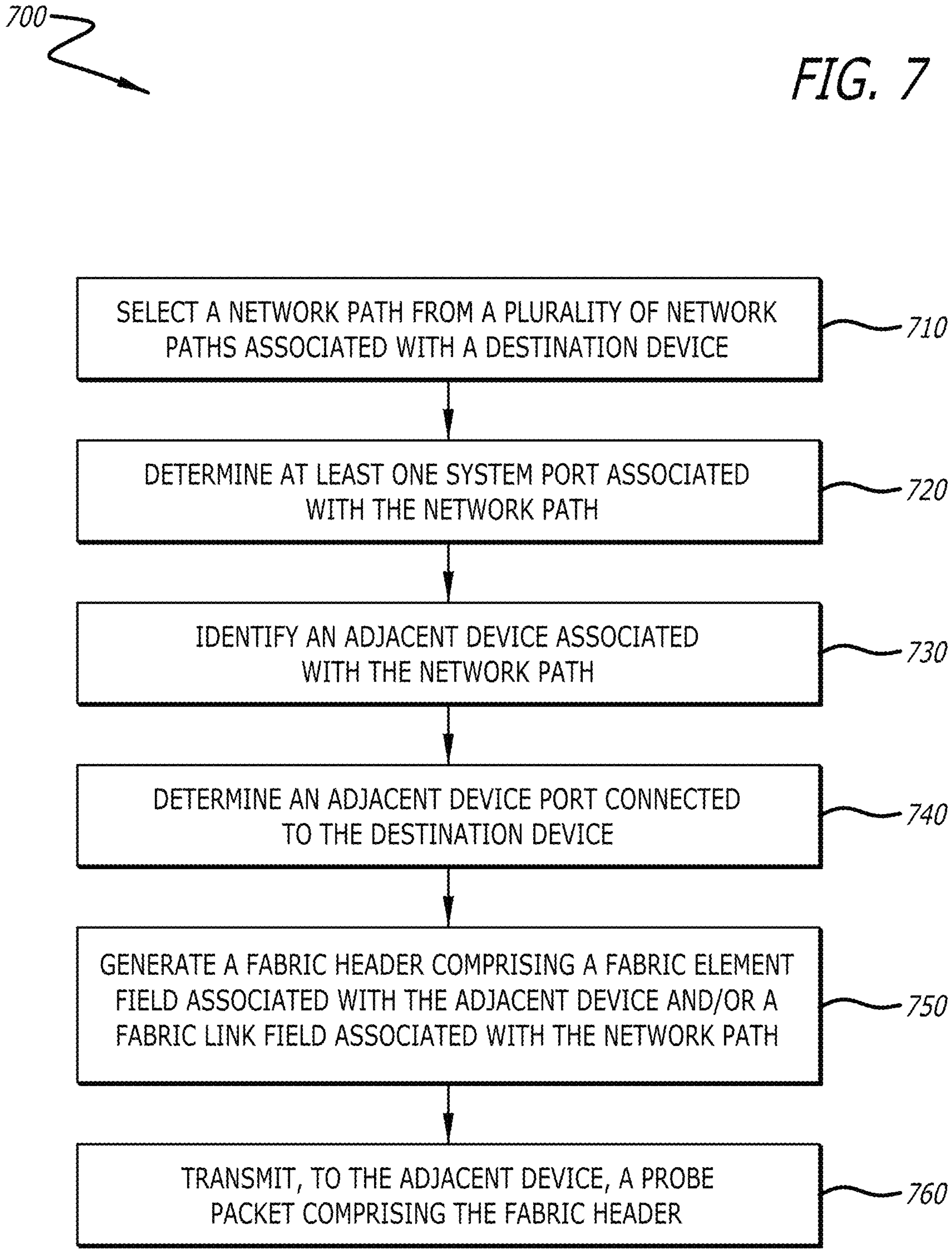
FIG. 7 is a flowchart depicting a process for generating a fabric header, in accordance with various embodiments of the disclosure.

Referring now to FIG. 7, a flowchart depicting a process 700 for generating the fabric header, in accordance with various embodiments of the disclosure is shown. In many embodiments, the process 700 can select one network path from the plurality of network paths associated with the destination device (block 710). In some embodiments, the process 700 may select the network path based on the routing data stored in the database. In certain embodiments, the process 700 can be performed by the source device, i.e., the first leaf switch, to probe the network path connecting to the destination device, i.e., the second leaf switch.

In a number of embodiments, the process 700 may determine at least one system port associated with the network path (block 720). In some embodiments, the at least one system port can be a fabric facing port connected to one or more spine switches in the network. In certain embodiments, the at least one system port may be in communication with the second leaf switch by way of the one or more spine switches.

In various embodiments, the process 700 can identify an adjacent device associated with the network path (block 730). In some embodiments, the process 700 may identify the spine switch of the one or more spine switches connected to the second leaf switch. In certain embodiments, the process 700 can identify the adjacent device, i.e., the spine switch based on the routing data.

In additional embodiments, the process 700 may determine an adjacent device port connected to the destination device (block 740). In some embodiments, the process 700 can identify, based on the routing data, the system port of the spine switch connected to the second leaf switch. In certain embodiments, the process 700 may determine an adjacent device port identifier associated with the identified system port of the spine switch. In more embodiments, the adjacent device port identifier associated with the identified system port of the spine switch can be included in the fabric header to enable the spine switch to determine the egress port for forwarding the probe packet.

In further embodiments, the process 700 can generate the fabric header comprising the fabric element field associated with the adjacent device and/or the fabric link field associated with the network path (block 750). In some embodiments, the process 700 may generate the fabric header based on one or more of: the adjacent device identifier associated with the spine switch, the adjacent device port identifier associated with the system port of the spine switch connected to the second leaf switch, or a fabric path identifier associated with the selected network path. In certain embodiments, the fabric header can be the source routed fabric header.

In many more embodiments, the process 700 may transmit, to the adjacent device, the probe packet comprising the fabric header (block 760). In some embodiments, the probe packet can be terminated at the spine switch, and thereafter be forwarded to the second leaf switch by the spine switch. In certain embodiments, the process 700 may transmit a stream of probe packets and/or may transmit multiple probe packets dynamically or periodically to the second leaf switch.

Although a specific embodiment for the process 700 for generating the fabric header for carrying out the various steps, processes, methods, and operations described herein is discussed with respect to FIG. 7, any of a variety of systems and/or processes may be utilized in accordance with embodiments of the disclosure. For example, the fabric header may be a network path-specific header and may comprise additional fields. The elements depicted in FIG. 7 may also be interchangeable with other elements of FIGS. 1-6 and FIGS. 8-9 as required to realize a particularly desired embodiment.

Figure 8:
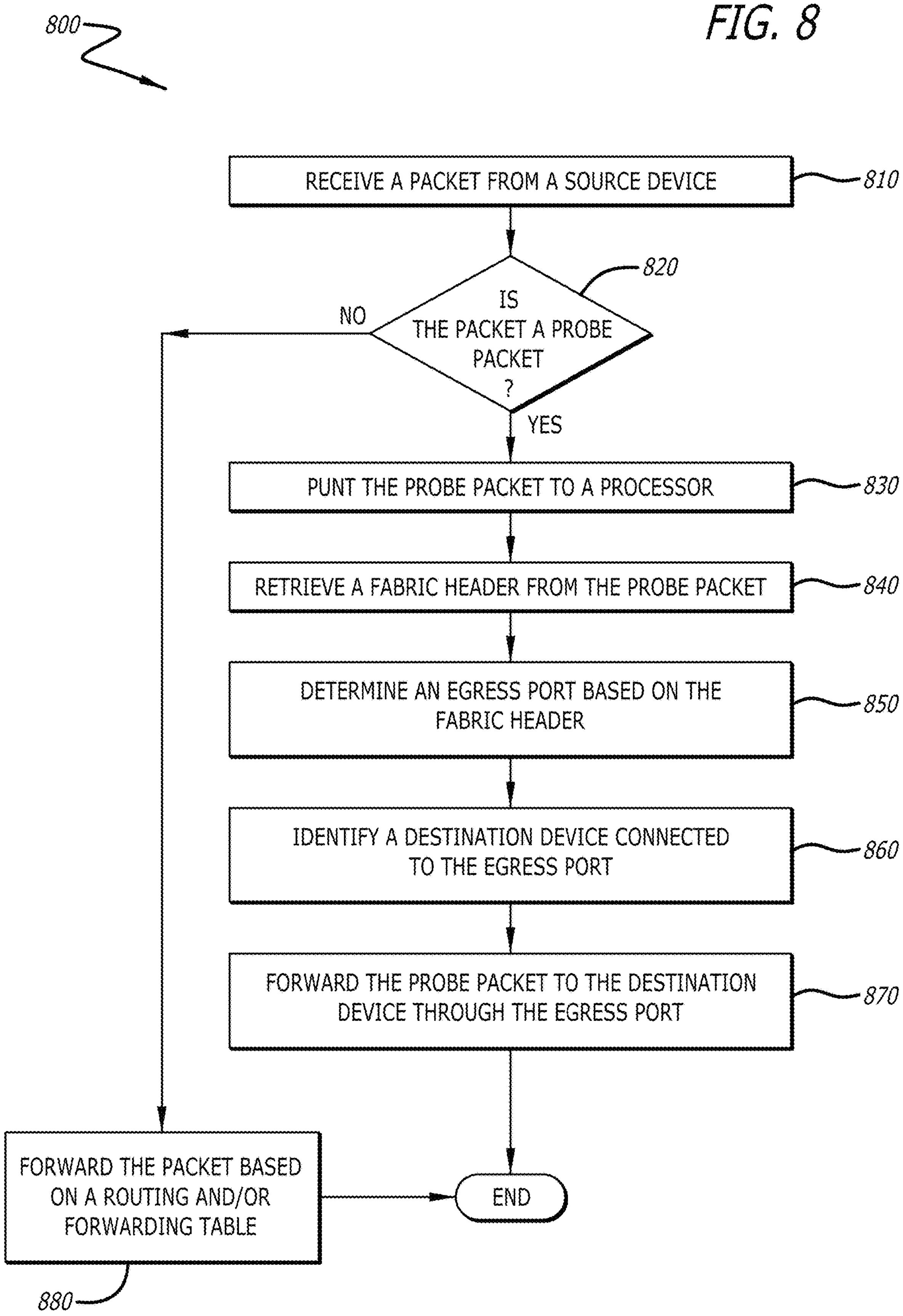
FIG. 8 is a flowchart depicting a process for forwarding a probe packet, in accordance with various embodiments of the disclosure.

Referring now to FIG. 8, a flowchart depicting a process 800 for forwarding the probe packet, in accordance with various embodiments of the disclosure is shown. In many embodiments, the process 800 can receive a packet from the source device (block 810). In some embodiments, the process 800 may be performed by the spine switch connected to the source device, i.e., the first leaf switch and the destination device, i.e., second leaf switch. In certain embodiments, the first leaf switch may transmit a packet to the spine switch.

In a number of embodiments, the process 800 may determine if the packet is a probe packet (block 820). In some embodiments, the probe packet can be identified based on the fabric header in the probe packet. In certain embodiments, the probe packet may be identified based on a header type field in the fabric header. In more embodiments, the probe packets can be punted to the RP or the control plane of the spine switch whereas the other packets may be forwarded based on one or more routing and/or forwarding tables.

In various embodiments, if at block 820 the process 800 determines that the packet is the probe packet, the process 800 can punt the probe packet to the processor of the spine switch (block 830). In some embodiments, the probe packet may be punted to the processor to ensure that the probe packet is forwarded to the second leaf switch by the spine switch. In certain embodiments, the probe packet is punted to the RP and/or the control plane of the spine switch.

In additional embodiments, the process 800 can retrieve the fabric header from the probe packet (block 840). In some embodiments, the fabric header can be indicative of the fabric link over which the probe packet can be forwarded by the spine switch. In certain embodiments, the fabric header may be further indicative of the adjacent device identifier associated with the spine switch.

In further embodiments, the process 800 may determine the egress port based on the fabric header (block 850). In some embodiments, the fabric header can include the fabric element field indicative of the adjacent device port identifier. In certain embodiments, the adjacent device port identifier in the field element of the fabric header may be utilized by the spine switch to identify the egress port though which the probe packet can be forwarded.

In many more embodiments, the process 800 can identify the destination device connected to the egress port (block 860). In some embodiments, the egress port can be connected to the second leaf switch. In certain embodiments, the process 800 may generate a modified probe packet based on the second leaf switch identifier associated with the second leaf switch, i.e., the identified destination device.

In many additional embodiments, the process 800 may forward the probe packet to the destination device through the egress port (block 870). In some embodiments, the process 800 can forward the modified probe packet that terminates at the second leaf switch. In certain embodiments, the second leaf switch can generate and transmit the response probe packet to the first leaf switch via the spine switch.

In many further embodiments, if at block 820 the process 800 determines that the packet is not the probe packet, the process 800 can forward the probe packet based on the routing and/or forwarding table (block 880). In some embodiments, the packet can be a data packet addressed to the second leaf switch. In more embodiments, the data packet may include a header comprising the IP and/or MAC addresses associated with the second leaf switch. In some more embodiments, the IP and/or MAC addresses can be utilized to identify the second leaf switch and forward the data packet to the second leaf switch.

Although a specific embodiment for the process 800 for forwarding the probe packet for carrying out the various steps, processes, methods, and operations described herein is discussed with respect to FIG. 8, any of a variety of systems and/or processes may be utilized in accordance with embodiments of the disclosure. For example, the probe packets can be punted to the RP of the spine switch whereas the data packets may be forwarded by an express forwarding function of the spine switch. The elements depicted in FIG. 8 may also be interchangeable with other elements of FIGS. 1-7 and FIG. 9 as required to realize a particularly desired embodiment.

Figure 9:
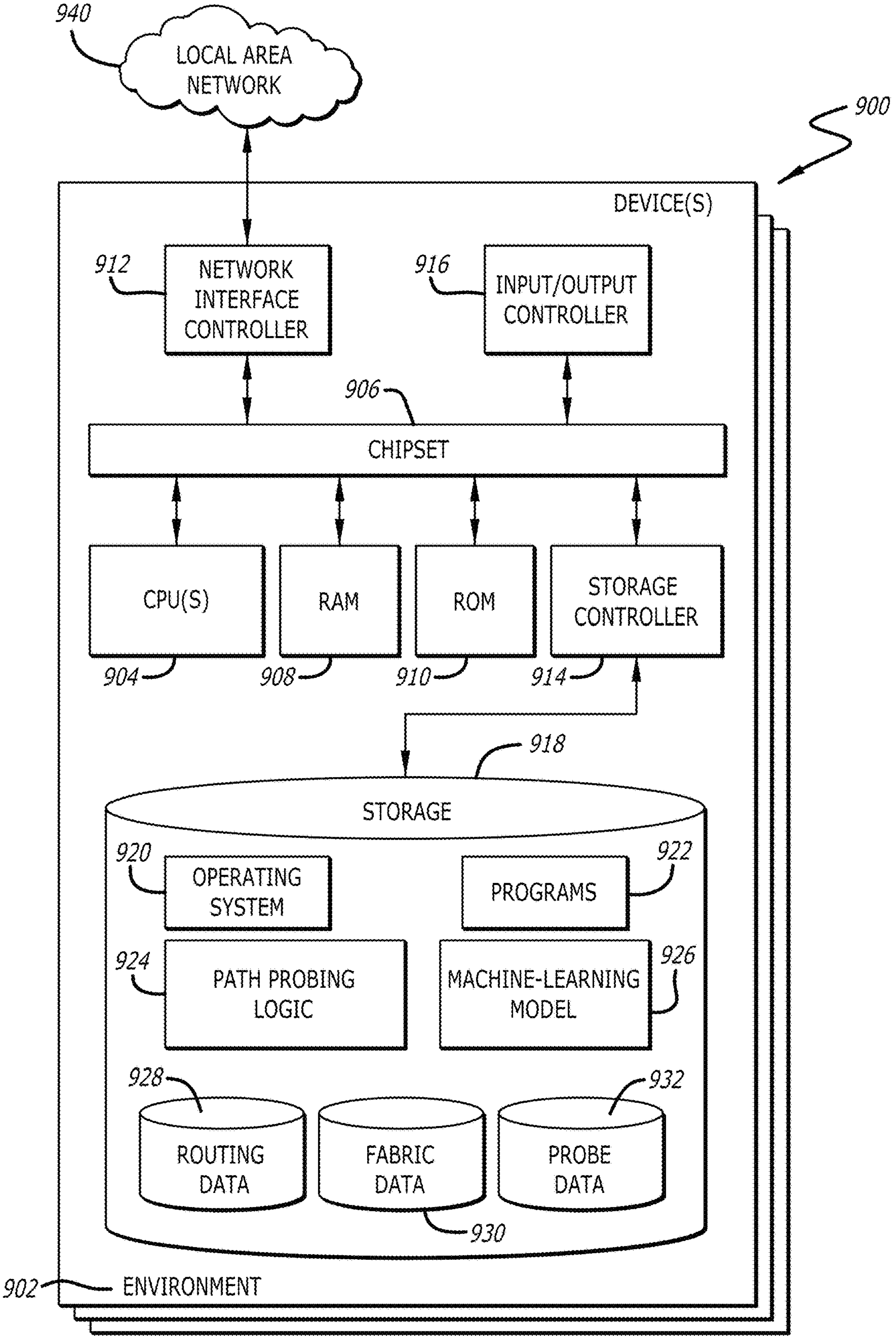
FIG. 9 is a conceptual block diagram of a device suitable for configuration with a path probing logic, in accordance with various embodiments of the disclosure.

Referring to FIG. 9, a conceptual block diagram of a device 900 suitable for configuration with a topology discovery logic, in accordance with various embodiments of the disclosure is shown. The embodiment of the conceptual block diagram depicted in FIG. 9 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 9 can also illustrate an access point, a switch, or a router in accordance with various embodiments of the disclosure. The device 900 may, in many non-limiting examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In a number of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Additional embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for instance, store an operating system 920, applications 922, routing data 928, fabric data 930, and probe data 932 which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The routing data 928 may be indicative of the network paths connecting to the spine and leaf switches in the DSF. The routing data 928 can be indicative of the global fabric topology. The fabric data 930 can include the fabric header. The probe data 932 may include the probe command and/or the probe packet. The probe data 932 can also include modified probe packets or response probe packets associated with the probe packets.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

In many more embodiments, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In many additional embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In certain embodiments, the device 900 can also include computer-readable storage media having instructions stored thereupon for performing any of the other computer-implemented operations described herein.

In many further embodiments, the device 900 may include a path probing logic 924. The path probing logic 924 can be configured to perform one or more of the various steps, processes, operations, and/or other methods that are described above. Often, the path probing logic 924 can be a set of instructions stored within a non-volatile memory that, when executed by the processor(s)/controller(s) 904 can carry out these steps, etc. In some embodiments, the path probing logic 924 may be a client application that resides on a network-connected device, such as, but not limited to, a server, switch, personal or mobile computing device in a single or distributed arrangement. The path probing logic 924 may receive the probe commands. The path probing logic 924 can generate the fabric headers and the probe packets comprising the fabric headers. The path probing logic 924 may transmit the probe packets to the network devices in the DSF.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

Finally, in numerous additional embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926.

The ML model(s) 926 can be configured to generate inferences to make predictions or draw conclusions from data. An inference can be considered the output of a process of applying a model to new data. This can occur by learning from at least the routing data 928, the fabric data 930, and the probe data 932 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for the device 900 suitable for configuration with the path probing logic for carrying out the various steps, processes, methods, and operations described herein is discussed with respect to FIG. 9, any of a variety of systems and/or processes may be utilized in accordance with embodiments of the disclosure. For example, the device 900 may be in a virtual environment such as a cloud-based network administration suite, or it may be distributed across a variety of network devices or switches. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor; and a memory communicatively coupled to the processor, wherein the memory comprises a path probing logic that is configured to:

receive a probe command associated with a destination device;

select at least one network path associated with the destination device;

determine an adjacent device port connected to the destination device;

construct a fabric header indicative of the at least one network path, wherein an adjacent device port identifier is associated with a system port of a spine switch connected to a second leaf switch;

identify, based on routing data, a system port of the spine switch connected to a second leaf switch; and generate a probe packet comprising the fabric header.

2. The device of claim 1, wherein the path probing logic is further configured to access a database, and wherein the database is configured to store routing data indicative of a plurality of network paths.

3. The device of claim 2, wherein the selection of the at least one network path is based on the plurality of network paths.

4. The device of claim 3, wherein the path probing logic is further configured to determine at least one system port associated with the at least one network path.

5. The device of claim 4, wherein the path probing logic is further configured to map the probe packet to a virtual output queue associated with the at least one system port.

6. The device of claim 4, wherein the path probing logic is further configured to identify, based on the routing data, at least one adjacent device associated with the at least one network path.

7. The device of claim 6, wherein the path probing logic is further configured to identify, based on the routing data, at least one adjacent device port of the at least one adjacent device.

8. The device of claim 7, wherein the at least one adjacent device port is connected to the destination device.

9. The device of claim 8, wherein the fabric header comprises a fabric element field indicative of at least one of: an adjacent device identifier associated with the at least one adjacent device, or an adjacent device port identifier associated with the at least one adjacent device port.

10. The device of claim 9, wherein the fabric header further comprises a fabric link identifier associated with the at least one network path.

11. The device of claim 10, wherein the path probing logic is further configured to transmit the probe packet to the at least one adjacent device through the at least one system port.

12. The device of claim 11, wherein the probe packet is forwarded to the destination device based on the fabric header.

13. The device of claim 9, wherein the plurality of network paths interconnect a plurality of devices including the at least one adjacent device and the destination device.

14. The device of claim 9, wherein the probe packet further comprises a network processing unit header and packet data.

15. A method, comprising:

accessing a database, wherein the database is configured to store routing data indicative of a plurality of network paths;

receiving a probe command associated with a destination device;

selecting, from the plurality of network paths, at least one network path associated with the destination device;

determining an adjacent device port connected to the destination device;

constructing a fabric header indicative of the at least one network path, wherein an adjacent device identifier is associated with the spine switch;

identify, based on routing data, a system port of the spine switch connected to a second leaf switch;

generating a probe packet comprising the fabric header; and transmitting the probe packet to the destination device.

16. The method of claim 15, wherein the method further comprises:

determining at least one system port associated with the at least one network path; and mapping the probe packet to a virtual output queue associated with the at least one system port.

17. The method of claim 16, wherein the method further comprises identifying, based on the routing data, at least one of:

at least one adjacent device associated with the at least one network path, or at least one adjacent device port of the at least one adjacent device connected to the destination device.

18. The method of claim 17, wherein the fabric header comprises a fabric element field indicative of at least one of: an adjacent device identifier associated with the at least one adjacent device, or an adjacent device port identifier associated with the at least one adjacent device port.

19. The method of claim 18, wherein transmitting the probe packet comprises transmitting the probe packet to the at least one adjacent device through the at least one system port, and wherein the probe packet is forwarded to the destination device based on the fabric header.

20. A device, comprising:

a processor; and a memory communicatively coupled to the processor, wherein the memory comprises a path probing logic that is configured to:

receive a probe packet from a source device;

retrieve a fabric header from the probe packet;

determine an egress port based on the fabric header, wherein an adjacent device port identifier is associated with a system port of a spine switch connected to a second leaf switch;

determine an adjacent device port connected to a destination device;

identify a destination device associated with the egress port; and forward the probe packet to the destination device through the egress port.

* * * * *